No. 760,662. PATENTED MAY 24, 1904.
P. B. SULLIVAN & G. F. TAYLOR.
CAR FENDER.
APPLICATION FILED SEPT. 2, 1903.
NO MODEL.
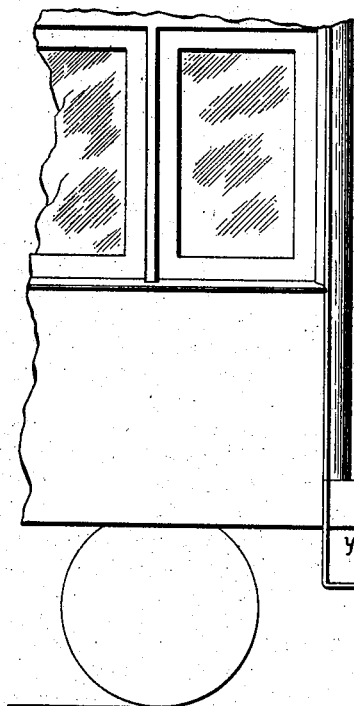
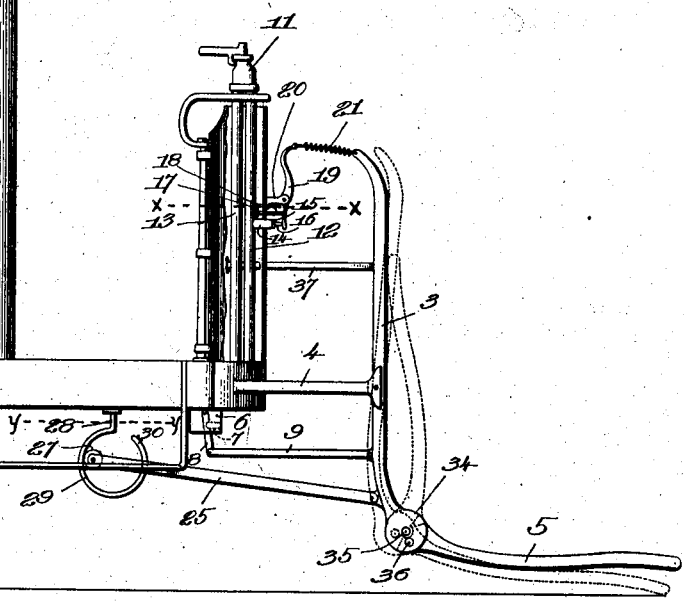
Fig. 1.
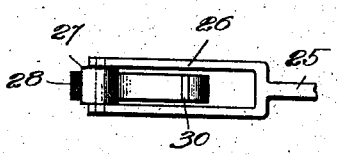
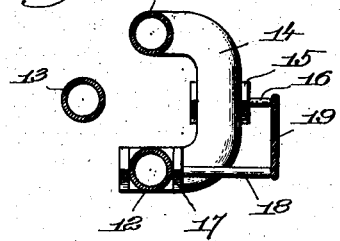
Fig. 3.  Fig. 2.
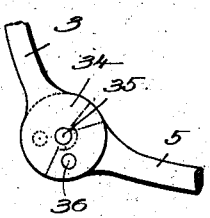
Fig. 4.
Witnesses:
Fred S. Greenleaf.
S. Wm. Lutton.
Inventors,
Peter B. Sullivan,
George F. Taylor,
by Crosby & Gregory
Attys.

No. 760,662. Patented May 24, 1904.

UNITED STATES PATENT OFFICE.

PETER B. SULLIVAN AND GEORGE F. TAYLOR, OF RANDOLPH, MASSACHUSETTS.

CAR-FENDER.

SPECIFICATION forming part of Letters Patent No. 760,662, dated May 24, 1904.

Application filed September 2, 1903. Serial No. 171,582. (No model.)

*To all whom it may concern:*

Be it known that we, PETER B. SULLIVAN and GEORGE F. TAYLOR, citizens of the United States, and residents of Randolph, county of Norfolk, State of Massachusetts, have invented an Improvement in Car-Fenders, of which the following description, in connection with the accompanying drawings, is a specification, like numerals on the drawings representing like parts.

This invention relates to car-fenders, and has for its object to provide a novel device connected with the fender which automatically applies the brake on the car and simultaneously cuts the current from the motor whenever the fender strikes an obstacle.

With the type of fender now commonly employed on street-cars many serious accidents occur because of the motorman "losing his head" at the critical time and failing to apply the brakes and cut the current from the motor, so as to stop the car in time. Our improvements are designed to prevent accidents resulting from this cause by providing means whereby the movement of the fender when struck operates to apply the brakes and stop the car.

In the drawings, Figure 1 is a side view of one end of a car having our improvements applied thereto. Fig. 2 is an enlarged section on the line *x x*, Fig. 1. Fig. 3 is a view on the line *y y*, Fig. 1; and Fig. 4 is a detail hereinafter described.

The fender may be of any suitable or usual construction, and, as herein shown, it comprises the back 3, which is hinged to the car in any suitable way—as, for instance, to the arms 4—and the nose or bottom portion 5. In this embodiment of our invention said nose or bottom portion is hinged to the back, so that the fender can be folded.

6 designates an ordinary switch-box, (herein shown beneath the car,) which incloses a switch controlling the current to the motor. The switch herein shown has the fixed contact 7 and the swinging switch-blade 8. The end of the blade 8 is connected by means of the link 9 with the fender 3, as shown, so that as the fender swings from the full to the dotted line position the switch is opened and the motor cut out.

We have herein shown our invention as applied to a car having the air-brake system, and when so applied suitable means are provided which are operated by the fender when swung from the full to the dotted line position to admit air to the brake-cylinder, whereby the brakes are applied. As herein shown, 10 designates the pipe leading from the auxiliary reservoir to the usual engineer's valve 11. 12 designates the pipe leading from said valve to the brake-cylinder, and 13 designates the exhaust-pipe. In this form of our invention the pipes 10 and 12 are connected below the valve by a by-pass connection 14, which is controlled by a normally closed valve 15, having a projecting valve-stem 16. 17 designates another normally open valve for closing the exhaust, said valve having the projecting valve-stem 18. The valve-stems 16 and 18 are operated by one or more operating-levers which are connected to the upper end of the fender. In this form of our invention we employ a single operating-lever 19, which bears against both of the valve-stems 16 and 18, as best seen in Fig. 2, said lever being pivoted to any suitable fixed support, as to bracket 20, and connected to the upper end of the fender by a connection 21. The valve 15 is so constructed that an inward movement of the valve-stem opens said valve, while the valve 17 is so constructed that a similar movement of the valve-stem closes the valve.

With this construction it will be seen that whenever the front of the fender strikes an obstacle and the fender is swung into the dotted-line position such movement thereof, through the connection 21, operates to open the valve 15 and close the valve 17, thus opening connection between the air-reservoir and the brake-cylinder and closing the exhaust from the cylinder. The brakes are by this means instantly applied. Simultaneously with the applying of the brakes the switch-blade 7 is moved through the link 9 to cut the motor out. Whenever the fender meets an obstacle, therefore, the car is instantly stopped without the necessity of any action on the part of the motorman. This is of great importance, because many times a motorman gets so "rattled" that he fails to apply the brakes when he should.

The fender is normally held in the full-line position with its nose elevated by means of a suitable strut or member 25, having a forked end 26, carrying a roll 27, which bears against a leaf-spring 28, secured at one end to the car. The spring 28 has the rounded bearing-surface 29, against which the roll plays, and is provided with the point or end 30, which passes up between the fork 26, and thus serves as a means for holding the fork in position. The curved surface 29 permits the strut 25 to change its position as the fender swings. The spring 28 is made of spring metal, so that whenever the nose of the fender strikes an obstacle said spring can yield sufficiently to allow the nose to swing downward against the track.

As stated above, we prefer to pivot the nose portion 5 of the fender to the back. Any suitable hinged connection between these parts may be employed. As herein shown, the back 3 has the enlarged end 34, through which the hinge-rod 35 passes, the nose 5 being hinged on said rod. A suitable pin 36, which passes through the enlarged portion 34 and the corresponding enlarged portion on the nose 5, serves to lock the nose in adjusted position.

Since during the normal running of the car the fender is likely to have a slight movement about its pivot, we prefer to make the connection 21 an elastic connection or spring connection, so constructed that such slight movement will not affect the valves 15 or 17. Whenever the fender is swung into the dotted-line position, however, to bring its nose against the rails, the connection 21 operates the valve, as above described.

37 designates a pusher member connected to the fender and terminating within reach of the motorman. This pusher member furnishes means whereby the motorman may throw the fender into dotted-line position, and thus apply the brakes and stop the car.

It will be obvious, therefore, that very many changes in the construction of the parts may be made without departing in any way from the spirit of the invention.

Having described our invention, what we claim as new, and desire to secure by Letters Patent, is—

1. A car, a fender hinged thereto, brake-operating mechanism, and a yieldable connection between the fender and said brake-operating mechanism, said yieldable connection permitting the fender to vibrate slightly without throwing the brake-operating mechanism into operation.

2. A car, a fender hinged thereto, air-brake mechanism including a valve to control the admission of air from the reservoir to the brake-cylinder, and a spring connection between said valve and the fender.

3. A car, a fender hinged thereto, air-brake-operating mechanism comprising a manually-controlled valve, a pipe leading from said valve to the air-reservoir, another pipe leading from said valve to the brake-cylinder, and fender-operated means independent from said valve to open communication between said pipes and thus apply the brakes.

4. A car, a fender hinged thereto, air-brake mechanism including pipes connecting the reservoir with the brake-cylinder, and an exhaust-pipe from the brake-cylinder, a manually-operated valve controlling the communication between said pipes, and fender-operated means independent from said valve to open communication between the reservoir and brake-cylinder and close the exhaust-pipe.

5. A car, a fender hinged thereto, brake-operating mechanism, communications between the latter and the fender, a forked strut connected to the fender, and a resilient U-shaped resistance member against which the strut bears, one arm of said resistance member entering between the flanges of the fork and acting as a guide.

6. A car, a fender hinged thereto, air-brake-operating mechanism comprising an air-pipe connecting with the air-reservoir, a second pipe connecting with the brake-cylinder, and an exhaust-pipe, and means whereby when the nose of the fender is depressed toward the tracks the exhaust-pipe is closed and communication is established between the first two pipes.

7. A car, a fender hinged thereto, air-brake-operating mechanism comprising a pipe connecting with the air-reservoir, and a pipe connecting with the brake-cylinder, a by-pass connecting said two pipes, a valve to close the exhaust and a valve controlling said by-pass, and means connected to the fender whereby when the latter is struck by an obstacle the first-named valve is closed and the latter opened.

In testimony whereof we have signed our names to this specification in the presence of two subscribing witnesses.

PETER B. SULLIVAN.
GEORGE F. TAYLOR.

Witnesses:
WILLIAM P. SULLIVAN,
FRANKLIN TAYLOR.